United States Patent Office 3,814,795
Patented June 4, 1974

3,814,795
ANTIBIOTIC S 15–1 AND PROCESS FOR
PRODUCING THE SAME
Kei Arima, Tokyo, Takeshi Kawamura, Saitama, Gakuzo Tamura, Tokyo, and Teruhiko Beppu, Matsudo, Japan, assignors to Asahi Kasei Kogyo Kabushiki Kaisha, Osaka, Japan
Continuation-in-part of abandoned application Ser. No. 177,382, Sept. 2, 1971. This application Nov. 15, 1972, Ser. No. 306,878
Claims priority, application Japan, Sept. 7, 1970, 45/77,803
Int. Cl. A61k 21/00
U.S. Cl. 424—116     3 Claims

ABSTRACT OF THE DISCLOSURE

New antibiotic S 15–1, $C_{18}H_{36}N_6O_{10}$, which has wide antimicrobial power against gram-positive, gram-negative, acid fast bacteria and, particularly, Newcastle disease virus and further, when in high concentration, against molds and yeasts is produced by culturing aerobically *St. griseocarneus* S 15–1 NRRL 5311 in a culture medium containing carbon and nitrogen sources and other nutritive materials until antibiotic S 15–1 is accumulated and then recovering the antibiotic from the medium.

---

Figure 1:
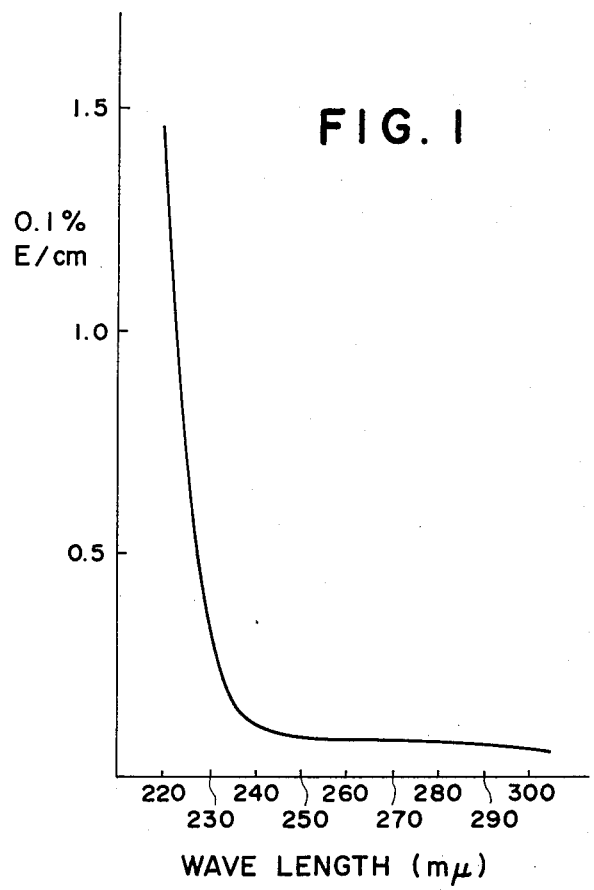

This application is a continuation-in-part application of our prior U.S. application Ser. No. 177,125,382 filed on Sept. 2, 1971, now abandoned.

This invention relates to a new antibiotic named as "S 15–1" and a process for producing the same by culturing an antibiotic S 15–1 producing strain belonging to the genus Streptomyces and then recovering the resulting antibiotic S 15–1 from the culture.

Antibiotic S 15–1 is a new antibiotic having properties set forth hereinbelow and inhibits the growth of gram-positive, grain-negative, and acid fast bacteria. When the antibiotic is used at a high concentration, it inhibits the growth of molds, yeasts and the like fungi. Furthermore, the antibiotic inhibits the growth in tissue culture of virus such as Newcastle disease virus. The antibiotic S 15–1 is useful in poultry husbandry.

An object of this invention is to provide a new antibiotic S 15–1.

Another object of this invention is to provide a method for producing the new antibiotic S 15–1.

Other objects and advantages of this invention will be apparent from the description set forth hereinbelow.

The microorganism used in the present invention is a strain of the genus Streptomyces which can produce in the culture thereof the antibiotic S 15–1 in an amount sufficient to be recovered. As such strain of the genus Streptomyces, there may be shown, for example, a microorganism which is first isolated by the inventors from soil in the suburbs of Sendai City, Miyagi Prefecture, Japan. This microorganism is an S 15–1 which is identified by the inventors to belong to *Streptomyces griseocarneus*. The *Streptomyces griseocarneus* S 15–1 strain has such mycological properties as mentioned below. This strain is being deposited in Fermentation Research Institute, Agency of Industrial Science and Technology, Chiba City, Japan under FERM-P No. 706. This strain is also deposited with the United State Department of Agriculture, Northern Regional Research Laboratory, at Peoria, Illinois, United States of America and has been given the number NRRL 5311; a sample of this microorganism can be obtained from aforesaid Research Laboratory. (The deposit was made with aforementioned Research Laboratories with all restrictions on the availability to the public being irrevocably removed upon the granting of the patent.)

I. MORPHOLOGICAL CHARACTERISTICS

Growth in media with hyphae, as seen in actinomycets in general. Aerial mycelium, long and fibrous, or abundantly branched, sometimes slightly hooky; no whorls and no spirals. Ten or more conidia in chains at the tip of aerial mycelium, ellipsoidal or cylindrical, 0.6 to 0.7 by 1.1 to 1.3 microns. Spores, smooth surface.

II. BEHAVIORS ON VARIOUS CULTURE MEDIA (1) Czapeks' Dox agar plate (27° C.):
    Growth cream-colored; aerial mycelium scant, white; no soluble pigment.

(2) Glucose-asparagine agar plate (27° C.):
    Colorless growth; aerial mycelium white, powdery, scant. No soluble pigment.

(3) Starch synthetic agar plate (27° C.):
    Colorless growth; white to ash-gray aerial mycelium, well developed. Gray soluble pigment, scant. Starch is actively hydrolyzed.

(4) Ca-malate agar plate (27° C.):
    Colorless growth; aerial mycelium scant, white. No soluble pigment.

(5) 0.2% Sodium nitrate-incorporated peptone water (30° C.):
    Colorless growth in masses at the bottom. No soluble pigment. Nitrites produced from nitrates.

(6) Broth agar slant (27° C.):
    Growth grayish yellow, wrinkled; no aerial mycelium. Pale brown soluble pigment.

(7) Sugar-incorporated broth agar slant (27° C.):
    Growth grayish yellow, wrinkled; aerial mycelium scant, white. Pale brown soluble pigment.

(8) Coagulated Loeffler's blood serum slant (27° C.):
    Growth white to ash-gray; no aerial mycelium. Soluble pigment gray to grayish black. No liquefaction. No growth at 37°.

(9) Bennett's agar plate (27° C.):
    Growth yellow; thick aerial mycelium, pinkish gray. Pale brown soluble pigment. No growth at 37° C.

(10) Gelatin (12° C.):
    Growth colorless to pale brown; white, thick aerial mycelium in stab. Slow liquefaction. Pale brown soluble pigment.

(11) Milk (30° C.):
    Growth cream-colored to brown rings; no aerial mycelium. Pale brown soluble pigment. Becomes transparent from the upper layer portion, and has weak peptonization action.

(12) Potato (27° C.):
    Growth grayish yellow, wrinkled; white powdery mycelium, scant. Soluble pigment grayish brown to grayish black.

(13) Tryosine agar slant (27° C.):
    Growth cream-colored; black soluble pigment.

III. BIOLOGICAL PROPERTIES

| | |
|---|---|
| Tyrosinase formation reaction | Positive. |
| Nitrite formation reaction | Do. |
| Skim milk coagulation reaction | Negative. |
| Skim milk peptonization reaction | Positive (weak). |
| Starch hydrolysis | Positive (strong). |
| Gelatin liquefaction reaction | Positive (weak). |
| Coagulated Loeffler's blood serum solubility | Negative. |

IV. UTILIZABILITY OF CARBON SOURCES

| | |
|---|---|
| Arabinose | + |
| Dextrin | + |
| Fructose | + |
| Glucose | + |
| Glycerin | + |
| Maltose | + |
| Mannose | + |
| Xylose | + |
| Sodium acetate | + |
| Sodium citrate | + |
| Sodium succinate | + |
| Inositol | − |
| Inulin | − |
| Lactose | − |
| Mannitol | − |
| Salicin | − |
| Raffinose | (−) |
| Rhamnose | (−) |
| Saccharose | (−) |
| Trehalose | (−) |

Note:
+: Utilized
−: Not utilized
(−): Utilizability doubtful

As mentioned above, the S 15–1 strain forms an aerial mycelium having no whorls or spirals and produces smooth conidia, and is a strain of the chromogenic type which gives an aerial mycelium of white to pale red color, later becoming ash-gray. It shows a cream-colored growth on Czapek's agar, and a colorless growth on glucose-asparagine agar, starch synthetic medium or Camalate agar, and is broad in scope of carbon source utilization spectrum.

In view of such characteristics of the S 15–1 strain, there may be shown as homologous strains *Streptomyces cinnamonensis*, *Streptomyces bikiniensis*, *Streptomyces antibioticus* and *Streptomyces griseocarneus*.

Among these strains, *Streptomyces cinnamonensis* is distinguished from the S 15–1 strain in that the former develops a salmon pink-colored aerial mycelium on glucose-asparagine agar, whereas the latter shows a colorless growth. *Streptomyces bikiniensis* is distinguished from the S 15–1 strain in that it produces an amber-colored pigment on glucose-asparagine agar and a pale brown pigment on a synthetic medium. *Streptomyces antibioticus* is distinguished from the S 15–1 strain in that it shows a white growth on a synthetic medium, develops a greenish gray aerial mycelium on a milk medium, and forms a bluish pigment and shows a brown growth on a potato medium. The known *Streptomyces griseocarneus* more or less differs from the S 15–1 strain in nitrate reducibility, saccharide assimilability, etc., but well coincides therewith in other points. From the above results, the inventors conclude that the S 15–1 strain belongs to *Streptomyces griseocarneus*, and distinguish the S 15–1 strain from the known strain, denominating the same as *Streptomyces griseocarneus* S 15–1.

The properties of *Streptomyces griseocarneus* S 15–1 are as mentioned previously. However, the properties of this strain are liable to be varied as seen in other strains of the genus Streptomyces, and are variable by artificial means using, for example, ultraviolet rays, X-rays, radioactive rays or chemicals. All the thus obtained variants may also be used in the present process so far as they belong to *Streptomyces griseocarneus* and have ability to produce the antibiotic S 15–1.

In the present invention, the aforesaid strain is cultured in a medium containing nutrients capable of being utilized by known microorganisms. That is, the strain having antibiotic S 15–1 producing ability may be aerobically cultured in a medium containing a carbon source, a nitrogen source, inorganic salts and, if necessary, a slight amount of an organic nutrient source. As the nutrient sources, there may be used known sources which have heretofore been utilized for the culture of strains of the genus Streptomyces. For example, glucose, starch, dextrin, glycerin or the like may be used as the carbon source, and soybean flour, meat extract, peptone, corn steep liquor, ammonium sulfate, sodium nitrate or the like may be used as the nitrogen source. In addition thereto, there may be added, if necessary, inorganic salts such as calcium carbonate, sodium chloride, potassium chloride, phosphate, etc., and a minor amount of such organic and inorganic materials as accelerating the growth of the strain and promoting the production of the antibiotic S 15–1.

As the culture method, a liquid culture method, particularly a submerged tank culture method, is the most suitable, like in the case of production of known antibiotics. The culture is effected under aerobic conditions, and a temperature preferable for the culture is 20° to 35° C. pH for the culture is preferably from 5 to 9. In most cases, however, the culture is carried out at about 28° C. Thus, the amount of antibiotic S 15–1 produced reaches maximum in 2 to 6 days either in shaking culture or tank culture.

Antibiotic S 15–1 exhibits such physicochemical properties as mentioned later, and hence can be extracted and purified according to the said properties. Antibiotic S 15–1 produced by the culture is recovered from a culture filtrate separated by filtration, either in the form of a base, in the form of a salt, in the form of an impure product or in the form of a purified solid. For example, antibiotic S 15–1 is recovered in such a manner as mentioned below.

The culture filtrate (beer) is adsorbed on a cation-exchange resin such as Amberlite IRC–50 (H-form), washed with water, eluted with a dilute acid, freed from excess acid by use of Amberlite IR–45 (OH-form), concentrated and then freeze-dried. The resulting crude powder is extracted with methanol, and the extract is concentrated and charged into a large amount of acetone to obtain antibiotic S 15–1 (hydrochloride) as a precipitate. This hydrochloride is subjected to cellulose column chromatography (eluted with an acetic acid-containing solvent), and the active portion is concentrated and then freeze-dried to obtain a powder (acetate). The thus obtained powder is converted into a hydrochloride or sulfate by use of an ion-exchanged resin (H-form). When the above-mentioned acetate is treated with a weakly basic ion-exchange resin, the antibiotic is isolated as a free base. The hydrochloride, base and sulfate obtained in the above manner are white powders.

Physicochemical properties of antibiotic S 15–1 are set forth below.

Figure 2:
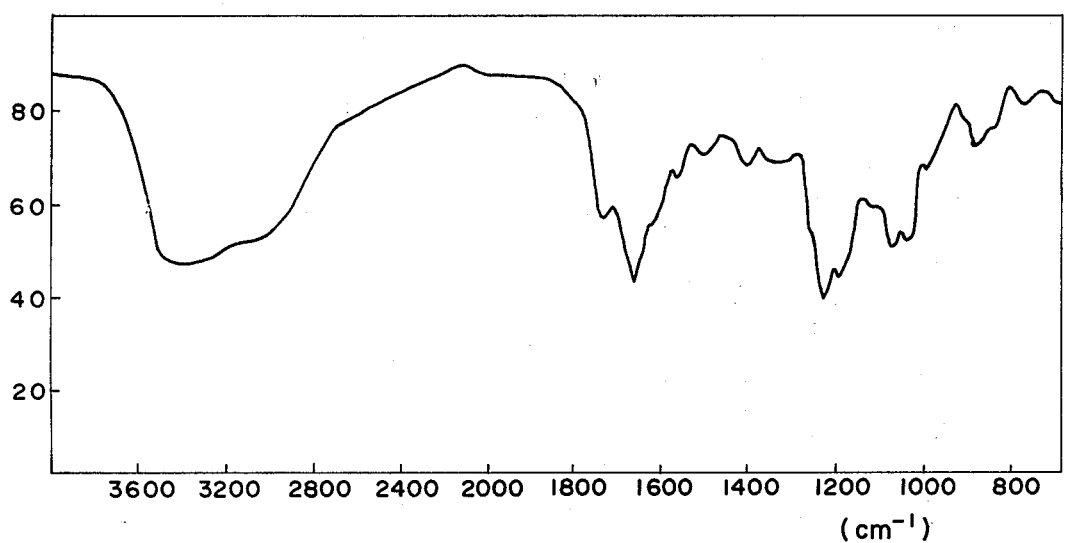

This substance (free base) decomposes at 161° to 162° C. to develop a yellow color. Hydrochloride of the free base is well soluble in water and methanol, sparingly soluble in lower alkyl alcohols such as ethanol, and insoluble in such organic solvents as acetone, ethyl acetate, chloroform, ether, benzene and the like. The base and sulfate are well soluble in water, but sparingly soluble in methanol and insoluble in other organic solvents. The optical rotation of the hydrochloride as measured in an aqueous solution thereof is $(\alpha)_D$ −26°. The ultraviolet absorption curve of the antibiotic S 15–1 (hydrochloride) is shown in FIG. 1, and the infrared absorption curve (KBr tablet)

thereof is as shown in FIG. 2. In view of the behaviors according to paper electrophoresis, the antibiotic S 15-1 is a basic substance.

The antibiotic S 15-1 shows such color reactions that it is positive in each of ninhydrin, Fehling's, Elson-Morgan's, Molisch, silver mirror, anthrone, Sakaguchi's, and maltol reactions, and negative in each of biuret and orcinol reactions. The results of elementary analysis of the base are as follows:

C: 43.32%, H: 7.13%, N: 17.29%
Molecular formula: $C_{18}H_{36}N_6O_{10}$
Molecular weight: 496

The $R_f$ values of antibiotics S 15-1 measured according to paper chromatography are as set forth in the following table:

| | Developer | $R_f$ value |
|---|---|---|
| (1) | Aqueous saturated butanol | 0.0 |
| (2) | 3% aqueous ammonium chloride solution | 0.95 |
| (3) | 50% acetone water | 0.10 |
| (4) | Phenol:water (3:1) | 0.35 |
| (5) | n-Butanol:methanol:water (4:1:2) | 0.05 |
| (6) | Solvent (5) (70 cc.) plus 1.5 g. of methyl orange | 0.35 |
| (7) | Benzene:methanol (4:1) | 0.0 |
| (8) | Aqueous saturated butanol plus 2% p-toluene-sulfonic acid | 0.15 |
| (9) | n-Propanol:pyridine:acetic acid:water (15:10:3:12) | 0.35 |

In view of the above-mentioned physicochemical properties, i.e. in view of the fact that the antibiotic S 15-1 is a water-soluble antibiotic having an optical rotation of (−) and is maltol reaction positive, the antibiotics S 15-1 is regarded as an antibiotic of the Streptomycin type. As antibiotics of the Streptomycin type, there have been known streptomycin, dihydrostreptomycin, hydroxystreptomycin, mannosidostreptomycin and glebomycin. However, all these antibiotics are distinguished from the antibiotic S 15-1 in that they are different therefrom in optical rotation and are ninhydrin reaction negative.

Antimicrobial spectra of the antibiotic S 15-1 against various microorganisms are as shown in the following table:

| Test microorganisms | Minimum inhibitory concentration (mcg./ml.) | Medium |
|---|---|---|
| Bacillus subtilis PCI 219 | 0.78 | I |
| Bacillus cereus IFO 3001 | 25.0 | I |
| Staphylococcus aureus 209-P | 0.78 | I |
| Sarcina lutea PCI 1001 | 6.25 | I |
| Corynebacterium equi | 25.0 | I |
| Escherichia coli K-12 | 3.13 | I |
| Escherichia coli B (SM-R) | 3.13 | I |
| Serratia marcescens ATCC 9986 | 25.0 | I |
| Aerobacter aerogenes ATCC 7256 | 6.25 | I |
| Vibrio metschnikovii B-3-6 | 12.5 | I |
| Mycobacterium 607 (SM-R) | 6.25 | I |
| Saccharomyces cerevisiae | >100 | II |
| Candida albicans IAM 4888 | 50.0 | II |
| Cryptococcus neoformans IAM 4514 | 25.0 | II |
| Aspergillus niger | 50.0 | II |
| Penicillium chrysogenum FAT 917 | 100.0 | II |

NOTE.—SM-R=Streptomycin resistant strain. Medium I=Bouillon. Medium II=Sabouraud's medium containing 2.0% glucose.

As is clear from the above table, the antibiotic S 15-1 has wide antimicrobial power or potency against gram-positive, gram-negative and acid fast bacteria and, when increased in concentration, against molds and yeasts.

Furthermore, in a Newcastle disease virus growth-inhibiting test carried out in the tissue culture of chick-embryo cell, using a culture medium incorporated with 100 μg./ml. of streptomycin and 100 U/ml. of penicillin, the incorporation of 100 μg./ml. of the antibiotic S 15-1 results in the complete growth inhibition of said virus. Further tests are conducted in such a manner that drinking water in which a given amount of S 15-1 is dissolved is fed every day, to find that chickens are prevented from infection or those which have already been suffered from disease do not become more serious but rather not serious.

| Amount of S 15-1 added to drinking water γ/ml. | Remarks |
|---|---|
| 50 | Seasons when Newcastle disease likely goes on. |
| 100 | Just when some chickens fallen ill are found. |
| | To chickens already fallen ill. |
| 500 | In addition, an aqueous solution containing 1000 γ/ml. of S 15-1 is dropped in eyes and nose or sprayed every day. |

The toxicity of the antibiotic S 15-1 is such that a mouse does not die even when intravenously injected with 250 mg./ml. of the antibiotic.

The present invention is illustrated in further detail below with reference to examples, but it is needless to say that the examples are illustrative and various modifications are possible within the scope of the invention. Percent is referred to by weight per volume, unless otherwise defined.

EXAMPLE 1

Streptomyces griseocarneus S 15-1 (FERM-P No. 706; NRRL-5311) was inoculated in 40 liters of a liquid medium (pH 7.0) containing 3.0% of starch, 1.0% of polypeptone, 0.4% of sodium nitrate, 0.2% of potassium secondary phosphate, 0.1% of potassium chloride, 0.1% of magnesium sulfate and 0.002% of ferrous sulfate, and aerobically cultured with shaking in a jar fermentor at 28° C. for 50 hours. The culture liquor was filtered at pH 6.0 to obtain 30 liters of a filtrate (production unit 120 mcg./ml.).

The culture filtrate was passed at pH 7.0 through a column packed with 2 liters of Amberlite IRC-50 (H-form), washed with water and then eluted with 0.1 N-hydrochloric acid. The active fraction (3.0 liters) was neutralized with Amberlite IR-45 (OH-form), concentrated and then freeze-dried. The resulting crude powder was extracted with 100 ml. of methanol, and the extract was charged with 700 ml. of acetone to form a white precipitate (3.5 g.). 1.0 gram of this precipitate was purified according to cellulose column chromatography using a column packed with 250 g. of cellulose powder. As the developer was used a solvent comprising n-propanol, pyridine, acetic acid and water in a ratio of 15:10:3:12, and the eluted active fractions were collected. The fraction mixture was concentrated at a low temperature (30° C.) to remove the solvent, and the resulting aqueous layer was freeze-dried to form a moisture absorptive powder. This powder was dissolved in water, passed through Amberlite IR-45 (OH-form) to remove the acetic acid completely, neutralized with hydrochloric acid and then subjected to freeze-drying to obtain 120 mg. (titer 1,000 mcg./ml.) of the desired substance in the form of a white powder.

EXAMPLE 2

Streptomyces griseocarneus S 15-1 (FERM-P No. 706; NRRL-5311) was inoculated in 20 liters of a liquid medium (pH 7.0) containing 3.0% of dextrin, 3.0% of corn steep liquor, 0.4% of sodium nitrate, 0.2% of potassium secondary phosphate, 0.1% of potassium chloride and 0.1% of magnesium sulfate, and aerobically cultured with shaking in a jar fermentor at 27° C. for 50 hours. The culture liquor was filtered at pH 6.0 to obtain 15 liters of a filtrate (production unit 60 mcg./ml.).

The culture filtrate was adsorbed on a column (1.0 liter) of Amberlite IRC-50 (H-form), washed with water and then eluted with 0.1 N-hydrochloric acid. The active fraction (1.5 liters) was neutralized with a saturated caustic soda solution, and then desalted and purified according to active carbon chromatography using a column packed with a mixture comprising 150 g. of active carbon and 150 g. of Celite-545. After adsorption, the column was washed with water and eluted with 50% (weight/weight) methanol and 0.1% (weight/weight) hydrochloric acid-containing 50% (weight/weight) methanol, and the eluted active fractions were collected. The fraction mixture was concentrated at a low temperature (30° C.) to remove the methanol, and the resulting aqueous solution was freeze-dried to form 300 mg. of a crude powder. This powder was purified according to cellulose column chromatography using a column packed with 100 g. of cellulose. As the developer was used a solvent comprising n-butanol, acetic acid and water in a ratio of 2:1:1, and the eluted active fractions were collected. The active fraction mixture was concentrated at a low temperature (30° C.) to remove the solvent, and the resulting aqueous layer was freeze-dried to form a moisture absorptive powder. This powder was dissolved in water to a pH of 7.0, passed through a column packed with 30 g. of active carbon to remove the acetic acid, washed with water and then eluted with a 0.1% (weight/weight) hydrochloric acid-containing 80% (weight/weight) methanol, and the eluted active fractions were collected. The active fraction mixture was concentrated at a low temperature (30° C.) to remove the methanol, and the aqueous layer was freeze-dried to obtain 100 mg. (titer 1,000 mcg./ml.) of the desired substance in the form of a white powder.

What we claim is:

1. Antibiotic S 15–1, active against gram positive and negative and acid fast bacteria, having the molecular formula $C_{18}H_{36}N_6O_{10}$, the infrared absorption spectrum as shown in FIG. 2, being further characterized as decomposing at 161° to 162° C. to develop a yellow color, the said antibiotic as the free base or hydrochloride being soluble in water and methanol and insoluble in acetone, ethyl acetate and chloroform, the optical rotation of the hydrochloride in aqueous solution being $(\alpha)_D$ −26°, exhibiting positive color reactions in the ninhydrin, Fehling's, Elson-Morgan's, Molisch, silver mirror, anthrone, Sakaguchi's Maltol tests and negative reactions in the biuret and orcinol tests, having a molecular weight of 496 and exhibiting $R_f$ values in paper chromatography as follows:

3% aqueous ammonium chloride solution _____ 0.95
50% acetone-water _____ 0.10
Phenol-water (3:1) _____ 0.35

2. A process of producing antibiotic S 15–1 which comprises culturing *Streptomyces griseocarneus* S 15–1 NRRL 5311 in a culture medium containing sources of carbon, nitrogen and inorganic salts until a sufficient amount of the antibiotic has been imparted in the medium and recovering the antibiotic from the medium.

3. A process according to claim 2, wherein culturing is conducted at 20° to 35° C. and pH 5 to 9.

References Cited

Miller, The Pfizer Handbook of Microbial Metabolites, McGraw-Hill Book Co., Inc., New York, N.Y., 1961 pp. 38–39.

JEROME D. GOLDBERG, Primary Examiner